United States Patent Office 3,351,194
Patented Nov. 7, 1967

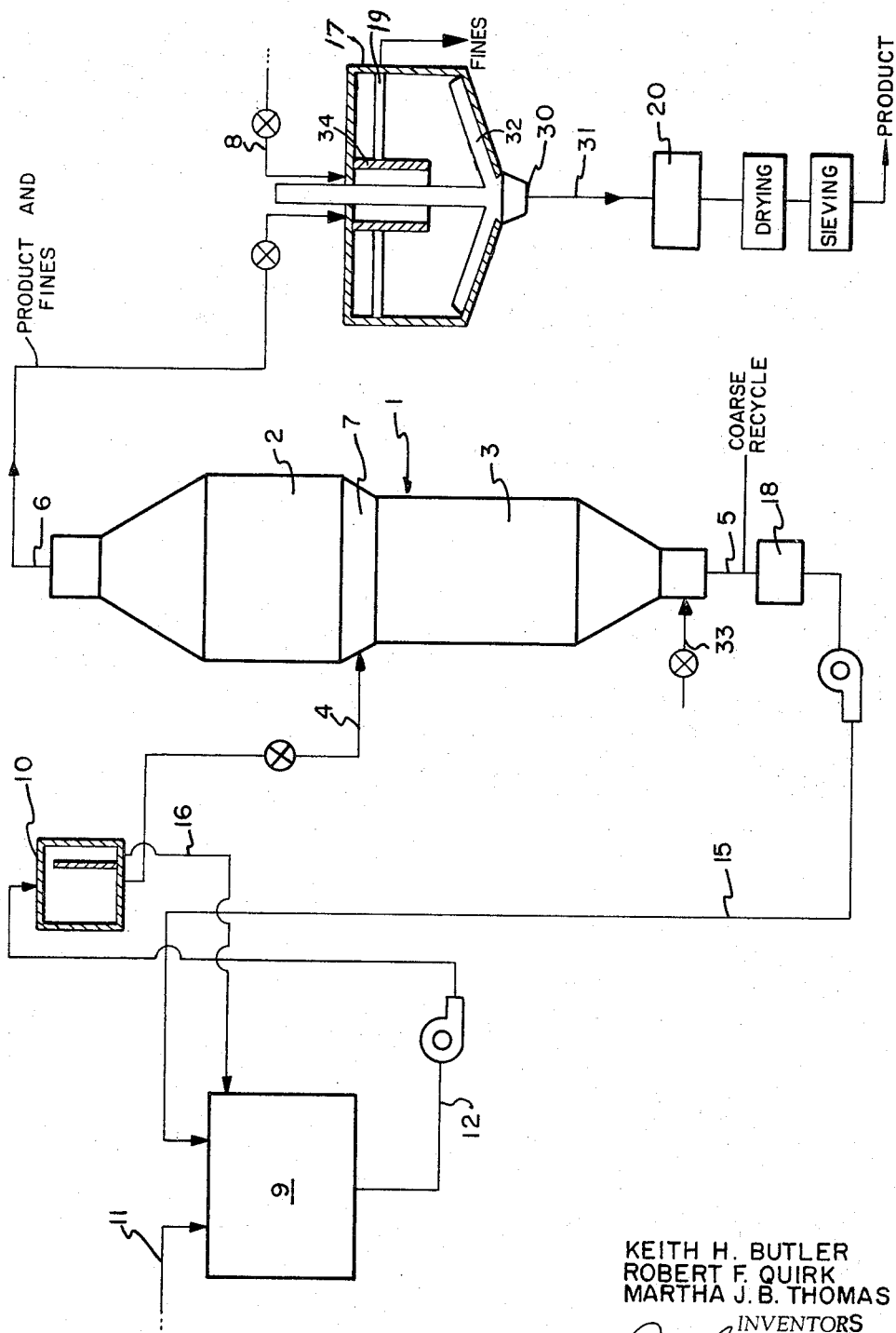

3,351,194
METHOD OF PROCESSING HALOPHOSPHATE PHOSPHORS
Keith H. Butler, Marblehead, Martha J. B. Thomas, Woburn, and Robert F. Quirk, Danvers, Mass., assignors to Sylvania Electric Products Inc., a corporation of Delaware
Filed Aug. 24, 1964, Ser. No. 391,687
13 Claims. (Cl. 209—5)

This invention relates to materials and methods for coating fluorescent lamps with phosphors. More particularly, this invention concerns improvements in the processing or treatment of the alkaline earth halophosphate family of phosphors.

The alkaline earth halophosphate family of phosphors are well known as luminescent materials and can be represented by the general formula $3M_3(PO_4)_2MX_2$, where M represents an alkaline earth metal, generally calcium or strontium, and X represents a halide, generally fluoride or chloride. Phosphors of this general composition can be prepared using alkaline earth metals, singly or in combination, in the form of suitable compounds with a single or several halides. To produce their luminescent properties, a small amount of M, as for example, where M is calcium, is replaced by an activator such as antimony or antimony and manganese. Various spectral energy distributions are obtained by suitable combinations of the basic material, $3M_3(PO_4)_2MX_2$, and the activator metals. The preparation of such alkaline earth halophosphate phosphors is described in the patent of McKeag and Ranby, 2,488,733 and is well known to the art. Members of the alkaline earth family of halophosphate phosphors possess exceptional brightness, in some instances exceeding 80 LPW at 100 hours life. However, there are several features which we have discovered can be improved. Such improvements can be realized in the brightness, particle size distribution and dispersability in aqueous or organic coating vehicles.

According to the prior art, the raw material mixture was fired at a temperature of 1100 to 1200° C. under suitable conditions. The reacted mass was subsequently cooled and appeared in the form of a lightly sintered, but friable, body or cake with a shape approximating the container in which the firing was carried out. Unfortunately, in order to utilize the phosphor as a coating for fluorescent tubes or bulbs, it had to be made into a powder by crushing, grinding, hammermilling, or by some other means of size reduction. Such crushed phosphor powder, however, frequently contained many particles which were not of an optimum size. Many particles were too large or too small. Undesirable sizes of particles were removed through dry classification, such as by a centrifugal separator using air as the carrier fluid. Generally, a fraction of about 60% of the input material could be separated by a single pass through the equipment. The fraction had the bulk of the particles not exceeding the desired maximum size. The remaining 40% in which the undesired larger size particles were concentrated, could be repassed through the air classifier a number of times until the bulk of the particles greater in size than the maximum desired was concentrated in about 10% of the input phosphor. The remaining 90% of the input material contained a mixture of particles in the desired size range and smaller. There were some few particles larger than the maximum; however, the mixture could be classified again to remove them. The product of these classifications containing substantially no particle above a maximum size could be reclassified to remove any smaller than the minimum desired size. After the classification, the particles in the powder were substantially between the minimum and maximum desired sizes. Generally, the desired minimum is about two to five microns and the desired maximum between twenty to thirty microns.

Air classification processes for particles in the general size range of 2 to 30 microns do not give a very precise separation but leave a substantial number of particles larger than the desired maximum and usually many smaller than the minimum. Such residues are probably caused by a particle to particle abrasion and turbulence within the system. Unfortunately then, air classification processes are inherently inefficient for precise size separation in the desired particle range. Furthermore, such processes require multiple handling of materials to achieve the required particle size separation. Sometimes also, the phosphor is contaminated by abrasion of the working surfaces of the classifier by the particles as well as being changed in size themselves.

In one embodiment of the prior art, such as disclosed in the patent to Butler et al., 2,691,601, after the phosphor was classified, it was given a surface treatment which removed some contaminents which were formed during the firing. The surface treatment included dissolving the contaminents and removing them by filtration and water rinses. For example, one method is washing the phosphor with a dilute solution of hydrochloric acid followed by filtration, a second wash with an aqueous solution of $NH_3$, and a final rinse and filtration. The filtered phosphor was then dried. The classified, washed and dried powdered phosphor was mixed in an organic or water-based vehicle, charged to a ball mill and milled until complete dispersion was obtained. Any large particles which were not removed during air classification were reduced to below the desired maximum size by the action of the mill. Even with the best methods of dry classification, the residual particles which exceeded the desired largest particle size were excessive in quantity and had to be eliminated by some form of size reduction, such as ball milling. The slurry was well dispersed from the ball milling and in the form of a paint and the particles were ground somewhat. It could be used to coat fluorescent tubes or bulbs in any of the conventional processes such as shown, for example, by Zdancewicz Patent No. 2,412,954. The above-described process, however was basically a batch-type operation and involved fairly high material losses and low labor efficiency.

When phosphors are incorporated in fluorescent lamps, it is necessary to limit the thickness of the coating to produce maximum brightness. For halophosphates, the coating thickness should be no more than 30 microns and generally less than about 18 to 22 microns.

The extremely fine size particles, less than 3 to 4 microns, are removed in order to maximize the amount of light. It is believed that particles smaller in size than 3 to 4 microns tend to scatter to a greater extent, and absorb to a lesser extent, the exciting radiation. Such usage of the exciting radiation is less efficient than with particles of a larger size. It is further believed that because particles less than 3 to 4 microns have a large surface area, they will be more effective in holding impurities from the thermal decomposition of organic binders present in aqueous or organic coating vehicles during lehring of the fluorescent tubes or bulbs.

Particles larger in size than 18 to 22 microns produce a coating which is thicker than the optimum for maximum light emission because they protrude from the coating on the bulb. Further, the outsize particles cause shadows in the coating and produce a grainy or less desirable appearance.

We have found that these less desirable characteristics of the alkaline earth family of halophosphate phosphors are improved by a more precise particle size separation of the material. Furthermore, we have discovered a method for simultaneously washing the phosphor and dispersing it in a coating vehicle to thereby eliminate grinding. Phosphors so processed are brighter than those hitherto obtained, have a more uniform particle size distribution and can be coated on the surface of fluorescent tubes or bulbs without the previous necessity of grinding them in the coating vehicle.

An object of our invention is to produce halophosphate phosphor of improved brightness, such improvement resulting from the manner in which the phosphor is processed after it has been obtained from the solid state calcination in the form of a sintered mass or cake.

Another object of our invention is to obtain a phosphor with a more uniform particle size distribution than can be obtained with present methods of phophor classification.

Yet another object of our invention is to improve dispersion of halophosphate phosphors in an aqueous or organic coating suspension to produce a homogeneous mixture of phosphor particles in the coating vehicle without grinding or ball milling.

A further object of our invention is to wash phosphors continuously and simultaneously classify them to obtain a uniform particle size distribution.

Other objects, advantages and features of the invention will become apparent from the following specification in which specific embodiments of the invention are described by way of illustrative examples. The figure is a flow sheet, illustrating equipment which can be used in our process.

Our process minimizes contamination introduced into the phosphor from dry classification and reduces the amount of milling. It effectively eliminates milling those phosphor particles which are within the desired range of particle size, by removing them by elutriation, leaving only the oversized particles to be ground under controlled conditions. The process simultaneously washes the phosphor and separates or classifies it into a desired particles size fraction. We have found that the phosphors treated according to our process are from 1 to 2 LPW brighter than can be obtained when following prior art. Such increases in brightness are attained because the particles are effectively restricted in size within the range of about 3 to 30 microns and dispersion of the phosphor in a coating vehicle is attained without milling in a ball mill.

The process which we have discovered to improve the processing and treatment of phosphors is as follows. Phosphors, such as for example, calcium chlorofluorophosphates activated by antimony and manganese, are obtained from the firing process and suitably crushed to a finely divided state. However, the crushing operation, as for example, by passing the material between wooden rollers, does not produce the exact particle size distribution which is necessary to fluorescent lamps. The crushed phosphor is then slurried in water or other suitable medium with a suitable dispersing agent, such as a mixture of $NH_3$ and ethylenediaminetetraacetic acid (EDTA) or some other chelating agent such as combination of $NH_3$ with nitrilotriacetic acid or hydroxyethylethylenediamintriacetic acid. The phosphor commonly used in fluorescent lamps are phosphates of certain metals of Group II of the periodic table such as magnesium, calcium, strontium, barium, zinc and cadmium. While these compounds are usually considered to be insoluble in water there is a slight solubility given a solution containing a small amount of positive divalent ions. It is believed that these ions tend to attach themselves to some of the phosphor particles and to cause them to attract to one another so as to flocculate into clumps which settle rapidly. We have found that this flocculation can be prevented by employing a chelating agent, together with an alkali to raise the pH above 7.5, to form a complex with these divalent ions. We believe that the effectiveness of the combination of chelating agent and alkaline medium is a change in the charge absorbed by the particles so that they tend to repel one another. Thus, the tendency to flocculate vanishes and a good dispersion is possible. These phenomena can be observed under a microscope with very fine particles, below 1 micron in size when distinct Brownian motion can be observed when the proper combination of chelating agent and alkaline medium has been obtained.

The mixture of $NH_3$ and EDTA will provide a dispersing action for the phosphor particles and also will remove dissolved and unwanted ionic species, such as $Ca^{+2}$, $Mn^{+2}$, $Cd^{+2}$, $Sb^{+2}$, in the subsequent filtration of the phosphor.

Referring now to the figure, the dispersed phosphor suspension is passed into the center of an elutriation column 1 and all particles of the phosphor which are above the desired maximum size, for example particles larger than 20 microns, are removed by sedimentation. Particles which are smaller in size than the desired maximum are eluted out of the elutriation column and removed by being carried upwardly in a carrier fluid. A suitable fluid is a mixture of water and the above mentioned washing and dispersing agent.

The elutriation column 1 is formed of two sections of glass pipe of different diameters. The large section 2 is mounted vertically over the smaller section 3 and joined through a coupling 7. The sections are capped at the unjoined ends. Entrance ports are provided for the attachment of entrance line 4 in the middle of the column 11 with a coarse particle discharge line 5 and a fine particle discharge line 6 at the top. The diameter of the sections is not critical but the pipe at the top should be larger, preferably by greater than about 25%, than the pipe at the bottom. The lengths of the pipes are not critical, but they should be at least two times as great as their respective diameters. In each section of the column 1, it is essential that the upward linear velocity of the phosphor suspension should be substantially constant.

The phosphor suspension in the larger diameter section 2 of the column must flow at a velocity in meters per hour calculated according to the following equation depending upon the desired particle size cut:

$$V = \frac{g \cdot 10^{-8} D^{-2}(d_1 - d_2)}{18n}$$

where:

V is the velocity of the liquid (cm./sec.),
g is the gravitational constant (981 cm./sec.$^2$),
D is the diameter of the particles to be separated (between about 10 to 30 microns),
$d_1$ is the density of the phosphor particles being processed (between about 2.5 to 3.5 gm./cm.$^3$),
$d_2$ is the density of the liquid (about 1 gm./cm.$^3$),
n is the viscosity in poise of the suspending liquid ($0.0131^{10°\ C.}$ to $0.0036^{80°\ C.}$), and hence, $$V = \frac{981 \cdot 10^{-8}(10 \text{ to } 30)^2 \cdot ([2.5 \text{ to } 3.5] - 1)}{18[0.0131 \text{ to } 0.0036]}$$

Exponential expressions of viscosity indicates the viscosity of the liquid at the temperature recited.

In the dual diameter column, the velocity of the suspension in the lesser diameter section must be equal to or greater than the velocity in the larger diameter section. The velocity in the narrower section, however, must be held below that which would cause the velocity in the wider section to exceed the calculated velocity for the desired particle size separation.

To obtain a size separation at 20 microns, the upward linear velocity in the top section of pipe must be maintained at 1.75 m./hr. at an ambient temperature between 0.5 and 40° C. In the bottom section, for the same separation diameter, the linear velocity must not be less than 1.75 m./hr. but can be somewhat greater, even as great as 2.63 m./hr. Adjustments in the velocities in both the top and bottom of pipes are made by changing the input of fresh water through line 33.

The particles cycled into input line 4 are of random size distribution from storage tank 9. Fresh unclassified and unwashed phosphor is added to the storage tank 9 through line 11. Separated coarse particles are recycled from the bottom of column 1 through recycle line 15. Preferably, a grinder 18 is interposed in line 15 so that the separated large particles can be ground and reseparated. From the storage tank 9, the particles are pumped through line 12 into an overhead weir 10 so that a constant head can be maintained in the input. Excess phosphor suspension is recycled from the overhead weir through line 16 to the storage tank 9.

The particles drawn from the top of the column 1 through line 6 are those left over from the coarse separation. If the coarse cut is made at 22 microns, the particles removed from the top are between 0 and 22 microns. These fine particles are cycled into the middle of a second elutriation column 17 to remove the undesired size particles. This second column can have the form of an open tank with an overflow over the edge into a weir and a sloping bottom along which the phosphor is moved by a rake. The velocity of the liquid in column 17 is controlled so that the desired separation is effected according to the following formula:

$$V = \frac{g \cdot 10^{-8} D^{-2}(d_1 - d_2)}{18n}$$

where:

V is the velocity of the liquid (cm./sec.),
g is the gravitational constant (981 cm./sec.$^2$),
D is the diameter of the particles to be separated (between about 10 and 30 microns),
$d_1$ is the density of the phosphor particles being processed (between about 2.5 to 3.5 gm./cm.$^3$),
$d_2$ is the density of the liquid (about 1 gm./cm.$^3$),
n is the viscosity in poise of the suspending liquid (0.0131$^{10° C.}$ to 0.0036$^{80° C.}$), and hence, $$V = \frac{981 \cdot 10^{-8}(10 \text{ to } 30)^2 \cdot ([2.5 \text{ to } 3.5] - 1)}{18[0.0131 \text{ to } 0.0036]}$$

Adjustments in the upward velocity are made by changing the input of fresh water through line 8. The very fine particles float to the top, overflow into a weir trough 19 and are cycled from the system for discard. The product particles fall to the bottom of the tank 17 and thence are pumped as a thick slurry into a storage tank 20. A rake 32 is slowly moved, the speed being such that turbulence is prevented in the second elutriation column 17 to prevent caking of the particles along the bottom. This rake moves the settled phosphor to a discharge cone 30 whence it is removed through line 31 into a container 20.

From the tank 20, the phosphor is dried. Drying, unfortunately, tends to reagglomerate some of the dispersed particles. Such reagglomerated particles can have agglomerated particle sizes larger than 20 or 30 microns and hence, cannot be used as coatings for lamps. Unless the particles are sieved, and sieved in a particular manner, the phosphor is less bright.

The process we use is a wet sieving operation in which a sieve is disposed in a conventional solvent such as toluene, xylene, benzene, etc. The sieve has a sieve size of about 325 (43μ) or 400 (37μ) mesh. The phosphor is placed in the screen and agitated. The combination of the solvent and the agitation breaks up the agglomerates and less than 1% of the input feed will remain as residue.

Following the deagglomeration, the solvent is decanted off for reuse. A conventional fluorescent lamp lacquer is admixed with the phosphor and adjusted to proper coating viscosity.

The wet sieving operation eliminates ball milling and hence the introduction of superfines (particles less than 3 or 4μ) which are detrimental to lamp brightness.

A convenient quantity of phosphor or slurry is prepared in the following manner. A dispersing agent mixture, such as for example, EDTA and an ammonia-water solution is formed. By appropriate choice of dispersing agent, one which effectively provides well dispersed solid phosphor phase in the liquid carrier fluid phase, a sharp separation of the phosphor into two fractions can be made. Further, by appropriate choice of dispersing agent, the unwanted crystalline phases which were formed as by-products during the solid state calcination of the phosphor will be dissolved and the phosphor will be simultaneously washed as it is being elutriated. We have found that the above-mentioned EDTA in ammonia is excellent for this purpose. Certain ingredients have to be mixed together to achieve a particle separation and efficient washing of the phosphor. EDTA is used in quantities of about ¼ to 5% by weight of the phosphor and sufficient ammonia should be used to adjust the pH of the phosphor suspension between about 7.5 to 11. In preparing the suspension and the ingredients, the EDTA is dissolved in ammonia and any residue is removed by filtration. About 150 to 250 gms. of phosphor is suspended in a liter of water and the EDTA-ammonia solution mixed therewith in proportions of about ¼ to 5% by weight of EDTA to the phosphor in the slurry.

In particular, 4 grams of EDTA are dissolved in 5.6 ml. of aqueous $NH_3$ of specific gravity 0.900. Any undissolved residue is removed by filtration. The EDTA-ammonia solution and 800 gms. of phosphor are simultaneously added to the water and the total volume adjusted to 3.8 liters. A large quantity of phosphor suspension of this composition is pumped to the column 1 through the weir; the overflow from the weir returning to the feed tank. With the column filled with slurry, additional distilled or deionized water of low conductivity is admitted to the bottom and rises at a linear velocity of 1.63 m./hr. to separate 20 micron diameter particles in the bottom (small diameter) section. Overflow from the top of the column is discharged through a transfer line. Phosphor slurry is admitted to the column at the coupling between the two sections. The discharge from the top of the column is controlled so that the upward linear velocity in both sections of the column is 1.63 m./hr. Broadly of course, any particle size may be separated from the mixture by adjusting the flow rate. The velocities which may be used are 0.037 m./hr. for 3 micron particles to 40.5 m./hr. for 100 micron particles.

Phosphor particles in the slurry admitted at the junction of the large and small column are separated. Those with diameters less than about 20 microns pass up the column in the carrier fluid and are discharged through the transfer line. Those diameters greater than about 20 microns settle to the bottom of the column. As the particles greater in size than 20 microns collect in the bottom of the column, they are bled off as a thick paste through the coarse particle discharge line. Following discharge, the coarse particles are cycled to a grinder and into storage tank 9 whereupon they are ready for recycle into the column through the input line. A constant head in the column is maintained by first recycling the suspension into the overhead weir.

The desired fraction of the phosphor, containing in this instance all of the phosphor particles of 20 microns and less, is transferred in the slurry form into a second elutriation column. The particles are again fractionated such that all particles less than the desired minimum size, for example 3 or 4 microns, are elutriated from the rest of the particles. Only particles between about 3 or 4 to 20 microns are left. In the second column all particles smaller in size than 3 or 4 microns are carried upward in the carrier fluid, while those particles greater than 3 or 4 microns, but smaller in size than 20 microns, due to the first elutriation column are withdrawn through the coarse particle discharge line as thick paste. The thick paste of phosphor particles is recovered by filtration after a final washing in water. Subsequently it can be suspended in a lacquer for coating on lamps with no additional milling.

EXAMPLE I

As a specific example of one embodiment of this invention, 1600 gms. of fired phosphor were crushed to a fine particle size and divided into two equal portions. 800 gms. of this phosphor were treated in the conventional manner. The remaining 800 gms. of phosphor were dispersed in an aqueous solution of $NH_3$ and EDTA. The slurry was prepared as follows: 4 grams of EDTA were dissolved in 5.6 ml. of aqueous $NH_3$ of specific gravity 0.900 (2833% $NH_3$ of 255 gm. $NH_3$.liter of solution). The EDTA–$NH_3$ solution and 800 gms. of phosphor were added to water such that the final volume of the suspension was 3.8 liters. The EDTA was present to the extent of 0.5% by weight based on the weight of phosphor and the suspension had a specific gravity of 1.145 at pH of 9.0 to 9.5. Slurry of this composition was fed continuously to an elutriation column and the phosphor particles larger in size than 20 microns were separated from the bulk of the material of sedimentation in the elutriation column.

The elutriation column had two sections of glass pipe joined together and mounted vertically. The top section, 0.3 meter internal diameter and 0.6 meter in length, was connected by a glass reducer to the bottom section, 0.15 meter internal diameter and 0.61 meter in length. Both ends of the column were capped with glass reducers thus making provision for entrance and exit process flow lines. Water was admitted at the bottom side of the lower column section at a flow rate of 32.6 l./hr. to provide an upward velocity in the bottom section of 1.63 m./hr. and sufficient water to carry off the settled coarse particles. Slurry, or composition specified above, was admitted to the column through an entrance in the side of the reducer coupling at a flow rate of 86.2 l./hr. Both streams combined at the reducer and flowed upward in the top section of the elutriation column at a velocity of 1.63 m./hr. Based on calculations from the previously mentioned mathematical formula, this velocity was sufficient, at 20° C., to carry all particles less than 20 microns up the column in the carrier fluid, while all particles greater in size than 20 microns settled to the bottom of the column. The sediment was collected at the bottom of the column and was bled from the column as a thick paste at the rate of 3.8 l./hr. The carrier fluid, moving up the column and containing the phosphor particles 0 to 20 microns in size, was carried off the top of the column at 115 l./hr. through an effluent line and discharged to a suitable container.

Slurry from the first column was then passed to a second column to remove all particles smaller in size than 3 microns. Particles of 3 microns and smaller sizes were overflowed from the second column and the particle size fraction from 3 to 20 microns was sedimented and removed continuously from the bottom of the second column as a slurry. The slurry was collected in a suitable container, acidified with hydrochloric acid to pH of 4.5, filtered, reslurried in deionized water, made basic to pH to 8.0 with aqueous $NH_3$, filtered and dried.

The dried phosphor was then treated in the following manner to prepare a coating suspension for application to the glass surface of fluorescent tubes or bulbs. A suitable container was filled with 1 liter of a solution consisting of 85% by volume of xylol and 15% by volume of n-butyl alcohol. To the foregoing solution, 4.2 ml. of "Armeen CD," a dispersing agent manufactured by the Armour Chemical Company and being a mixture of primary amines with alkyl radicals consisting of from 12 to 18 carbon atoms, was added and intimately mixed. A 325 mesh screen, mounted on a suitable support was suspended in the solution with the screen parallel to the liquid surface and 1 inch below it. 300 gms. of the dried phosphor, obtained from the combination elutriation-washing process, were continuously fed into the liquid above the screen surface during mild agitation. The phosphor was dispersed in the liquid and passed through the screen. Phosphor retention on the screen was much less than 1% and consisted of larger size agglomerates which were formed during the prior drying of the phosphor.

After screening the phosphor, the screen was withdrawn from the suspension of the phosphor and the phosphor was settled for 24 hours. The volume of the settled and packed phosphor was 175 ml. Eight hundred mls. of the supernatant solvent was decanted from above the settled phosphor, which was then mixed with 3.4 ml. of "Armeen CD" and resuspended by mixing. To the 296 ml. of resuspended phosphor was added sufficient ethylcellulose lacquer to form a phosphor suspension for the coating of fluorescent tubes or bulbs. The phosphor suspension or "paint" so formed was adjusted to appropriate values of specific gravity and viscosity by methods well known in the art and the resultant suspension was then used to coat fluorescent tubes or bulbs in the usual manner. The 800 gms. of phosphor set aside at the beginning of the process were processed or treated by the best methods of the prior art. Fluorescent tubes or bulbs coated with both types of phosphor suspension were processed into lamps on conventional lamp making machinery.

The brightness of lamps containing the phosphor processed by the treatment described herein as our invention is substantially improved as is evident from Table I. In addition to the improvement in brightness, its maintenance is improved also.

TABLE I

| Treatment | LPW After Various Hours Life | | | Improvement in LPW at Various Hours Life | | |
|---|---|---|---|---|---|---|
| | 0 hrs. | 100 hrs. | 500 hrs. | 0 hrs. | 100 hrs. | 500 hrs. |
| 1 a | 80.3 | 77.5 | 75.3 | +1.8 | +1.2 | +2.3 |
| 2 b | 78.5 | 76.3 | 73.0 | | | | a Combination Size Fractionation by Elutriation with Simultaneous Surface Washing and Dispersion Without Grinding.
b Conventional Processing.

EXAMPLE II

A calcium halophosphate phosphor in the form of a slightly sintered mass is obtained from the calcination step in the preparation of the phosphor. It was crushed to a finely divided state by passing the cake between a set of closely spaced wooden rolls. The crushed phosphor was slurried in an aqueous medium. The slurry was prepared as follows: Four hundred grams of EDTA were dissolved in 560 ml. of aqueous $NH_3$ of specific gravity 0.900. The EDTA–$NH_3$ solution and 80 kg. of crushed phosphor were added to water and brought to a total volume of 380 liters. EDTA was present as 0.5% by weight of the weight of phosphor in the slurry and the well dispersed, homogeneous slurry had a specific gravity of 1.145 and a pH of 9.0 to 9.5. Slurry of this composition was prepared in bulk and stored in a suitable container, for use as feed material to an elutriation column. The elutriation column was constructed of a suitable material and consisted of two cylindrical portions. The top portion was 0.56 meters in internal diameter and 0.76 meters in length; the bottom portion was 0.41 meters in internal diameter and 0.76 meters in length. The portions were joined by a truncated cone of 0.30 meters in length. Both the bottom of the lower portion and the top of the upper portion were fitted with tapered cones, at the apexes of which were inlet and outlet ports for process lines. Above the top of the entire elutriation column was a weir to maintain a constant hydrostatic head in the system. Water was admitted through the lower side of the lower portion at a flow rate of 288 l./hr. and flowed upwardly at a velocity of 2.23 m./hr. Phosphor slurry of composition described above was fed to the weir at a rate of 246 l./hr. 111 l./hr. of this slurry were fed into the column through a pipe from the bottom of the weir which discharged at the center of the conical section joining the two cylindrical portions together. The combined flow upward in the column from this point was 399 l./hr. providing a velocity in the upper cylindrical portion of 1.63 m./hr. Overflow from the weir was returned to the slurry storage container at a flow rate of 135 l./hr. The upward flow in the column was discharged to a second column to be described below. As the phosphor slurry entered the column at the midpoint between the two cylindrical portions, particles smaller in size than 20 microns were carried up the column by the rising carrier fluid. Particles greater in size than 20 microns settled toward the bottom of the column by sedimentation. The desired maximum size of the phosphor particle in the product was 20 microns. A linear velocity of 1.63 m./hr. at 20° C. corresponds to a separation at 20 microns according to the mathematical formula mentioned previously. The linear velocity in the bottom cylindrical segment was 2.23 m./hr. at 20° C. which corresponds to a separation at 23.5 microns. It was determined by independent experiments that the most efficient separation of phosphor into two fractions is accomplished by using a column with 2 linear velocities, the bottom linear velocity being about 10 to 20% greater than the top linear velocity. Settling velocities are calculated according to the preceding formula which presumes stream line flow of the carrier fluid and unhindered settling of spherical particles.

The coarse particles, larger in size than 20 microns settled, through the rising carrier fluid in the elutriation column, to the bottom of the column and were withdrawn by further settling through the flexible vertical two-inch pipe which connected the bottom of the elutriation column to the top of a vibro-energy mill. The vibro-energy mill had 0.29 m.³ capacity (free volume) and was one-third filled with cylindrical Burundum grinding media having a diameter of 2.06 cm. Water was also fed to the mill through a separate line, at a rate of 94.5 l./hr., which entered the mill at the bottom. An effluent line connected to the top cover of the mill carried off a dilute slurry of ground coarse phosphor particles at a rate of 94.6 l./hr. The carrier fluid velocity through the two-inch flexible down pipe from the bottom of the elutriation column was stationary. The grinding action of the mill, controlled by adjustment of the vibratory motion of the mill and the size and number of Burundum pellets, was such that the average particle size of the ground phosphor in the dilute effluent slurry from the mill was not smaller in size than the average particle size of the phosphor being removed from the top of the elutriation column. The effluent stream was recycled to the slurry makeup point. Thus the removal of the coarse particles from the phosphor, their subsequent size reduction and simultaneous washing were incorporated in a closed circuit which returned the ground coarse particles to the elutriation system with the result that all particles were properly sized and no material loss was encountered.

Dilute slurry, containing all particles 0–20 microns in size, was discharged from the top of the elutriation column at 399 l./hr. to the feedwell of a second column. A concentrated slurry of phosphor particles from 3.5 to 20 microns, having a specific gravity of about 1.130 was withdrawn from the discharge cone of the second column at a rate of 115 l./hr. The second column was 2.7 meters diameter and 1.1 meters deep. The excess liquid in this column was overflowed around a carefully leveled rim. An upward flow rate of 284 l./hr. in the column corresponded in a linear velocity of 0.05 m./hr. and separated all particles smaller in size than 3.5 microns which were carried off in the overflow. The underflow, from the discharge cone of the column, was fed to a storage tank and subsequently treated as described in Example I to obtain a dried material. The dried phosphor was dispersed in an appropriate organic coating vehicle, as described in Example I. Phosphors prepared by the process described in this example were tested with phosphors treated by conventional processes. The brightness of fluorescent lamps containing the phosphor processed by the treatment described herein is substantially improved over the brightness of lamps containing conventionally processed phosphor as is evident from Table II:

TABLE II

| Treatment | LPW After Various Hours Life | | | Improvement in LPW at Various Hours Life | | |
|---|---|---|---|---|---|---|
| | 0 hrs. | 100 hrs. | 500 hrs. | 0 hrs. | 100 hrs. | 500 hrs. |
| 1 ª | 80.5 | 77.2 | 76.5 | +2.1 | +0.8 | +1.2 |
| 2 ᵇ | 78.4 | 76.4 | 75.3 | | | |
| 1 ª | 79.8 | 77.7 | 75.7 | +1.4 | +1.0 | +1.3 |
| 2 ᵇ | 78.4 | 76.7 | 74.4 | | | |
| 1 ª | 80.1 | 78.0 | 76.3 | +1.0 | +1.0 | +1.5 |
| 2 ᵇ | 79.1 | 77.0 | 74.8 | | | |

ª Combined Size Fractionation by Elutriation with Simultaneous Surface Washing and Dispersion Without Grinding.
ᵇ Conventional Processing.

It is apparent that modifications and changes may be made within the scope of the instant invention by those skilled in the art, but it is our intention however, to be limited only by the following claims.

As our invention we claim:
1. A process for washing and classifying phosphors, the steps which comprise: forming a dispersed basic slurry of halophosphate phosphor with ammonia and a chelating agent; flowing said slurry into an elutriation column; introducing elutriating liquid into said elutriation column at a point below the introduction point of said slurry, said elutriating liquid being introduced at a predetermined velocity to cause the phosphor particles greater than a predetermined maximum particle size to drop downwardly in said column, the velocity of the liquid in said column at said point of introduction of said slurry being no more than the velocity of the liquid at a point below said point of introduction of said slurry, recovering at a point above said point of introduction of said slurry a washed phosphor having a particle size less than the predetermined maximum particle size.

2. The process according to claim 1 wherein the chelating agent is ethylenediaminetetraacetic acid.

3. The process according to claim 1 wherein particles smaller than a predetermined minimum size are removed from said recovered and washed phosphor and the remainder of said recovered and washed phosphor is dried and then admixed with a solvent, the admixture then being passed through a sieve to deagglomerate outsize particles.

4. A process for washing and classifying halophosphate phosphors, the steps which comprise: forming a dispersed basic aqueous slurry of said phosphor with an alkaline washing agent and a chelating agent; passing said slurry into an elutriation column; introducing elutriating liquid into said elutriating column at a point below the introduction point of said slurry; maintaining the upward velocity of the liquid in said column according to the formula:

$$V = \frac{g \cdot 10^{-8} D^{-2}(d_1 - d_2)}{18n}$$

where:

V is the velocity of the liquid (cm./sec.),
g is the gravitational constant (981 cm./sec.²),
D is the diameter of the particles to be separated (between about 10 and 30 microns),
$d_1$ is the density of the phosphor particles being processed (between about 2.5 to 3.5 gm./cm.³),
$d_2$ is the density of the liquid (about 1 gm./cm.³),
n is the viscosity in poise of the suspending liquid (0.0131$^{10°\ C.}$ to 0.0036$^{80°\ C.}$), the velocity of said elutriating liquid at a point above said point of introduction of said slurry being no more than the velocity of the liquid at a point below said point of introduction of said slurry, thereby causing phosphor particles greater than the desired maximum particle size to drop downwardly in said column and recovering at a point above said point of introduction of said slurry a washed phosphor having a particle size less than the predetermined maximum particle size.

5. A process for washing and classifying halophosphate phosphors, the steps which comprise: forming a dispersed basic aqueous slurry of said phosphor with ethylenediaminetetraacetic acid and ammonia; passing said slurry into an elutriation column; introducing elutriating liquid into said elutriating column at a point below the introduction point of said slurry; maintaining the upward velocity of the liquid in said column to the following formula:

$$V = \frac{g \cdot 10^{-8} D^{-2}(d_1 - d_2)}{18n}$$

where:

V is the velocity of the liquid (cm./sec.),
g is the gravitational constant (981 cm./sec.$^2$),
D is the diameter of the particles to be separated (between about 10 and 30 microns),
$d_1$ is the density of the phosphor particles being processed (between about 2.5 to 3.5 gm./cm.$^3$),
$d_2$ is the density of the liquid (about 1 gm./cm.$^3$),
n is the viscosity in poise of the suspending liquid ($0.0131^{10°\ C.}$ to $0.0036^{80°\ C.}$), the velocity of said elutriating liquid at a point above said point of introduction of said slurry being no more than the velocity of the liquid at a point below said point of introduction of said slurry, thereby causing phosphor particles greater than a predetermined maximum size to drop downwardly in said column and recovering a washed phosphor having a particle size less than the predetermined maximum particle size from the top of said column.

6. The process according to claim 5 wherein the velocity of the liquid in the lower portion of said column is up to two times as great as in the upper section of said column.

7. The process according to claim 6 wherein the particles larger than the predetermined size are withdrawn from the bottom of the column and ground to a finer particle and then recycled into said elutriation column.

8. The process according to claim 5 wherein particles smaller than a predetermined minimum size are removed from said recovered and washed phosphor and the remainder of said recovered and washed phosphor is dried and then admixed with a solvent, the admixture then being passed through a sieve to deagglomerate outside particles.

9. A process for washing and classifying halophosphate phosphors, the steps which comprise: forming a dispersed basic aqueous slurry of said phosphor with ethylenediaminetetraacetic acid and ammonia; passing said slurry into an elutriation column; maintaining the upward velocity of the liquid in said column according to the following formula:

$$V = \frac{g \cdot 10^{-8} D^{-2}(d_1 - d_2)}{18n}$$

where:

V is the velocity of the liquid (cm./sec.),
g is the gravitational constant (981 cm./sec.$^2$),
D is the diameter of the particles to be separated (between about 10 and 30 microns),
$d_1$ is the density of the phosphor particles being processed (between about 2.5 to 3.5 gm./cm.$^3$),
$d_2$ is the density of the liquid (about 1 gm./cm.$^3$),
n is the viscosity in poise of the suspending liquid ($0.0131^{10°\ C.}$ to $0.0036^{80°\ C.}$), the velocity of said elutriating liquid at a point above said point of introduction of said slurry being no more than the velocity of the liquid at a point below said point of introduction of said slurry, thereby causing phosphor particles greater than a predetermined maximum size to drop downwardly in said column and recovering a washed phosphor slurry having a particle size less than the predetermined maximum from the top of said column; passing the recovered phosphor slurry into a second elutriation column; introducing elutritating liquid into said second elutriating column at a point below the introduction point of said slurry; maintaining the upward velocity of the liquid in said second column according to the following formula:

$$V = \frac{g \cdot 10^{-8} D^{-2}(d_1 - d_2)}{18n}$$

where:

V is the velocity of the liquid (cm./sec.),
g is the gravitational constant (981 cm./sec.$^2$),
D is the diameter of the particles to be separated (between about 10 and 30 microns),
$d_1$ is the density of the phosphor particles being processed (between about 2.5 to 3.5 gm./cm.$^3$),
$d_2$ is the density of the liquid (about 1 gm./cm.$^3$),
n is the viscosity in poise of the suspending liquid ($0.0131^{10°\ C.}$ to $0.0036^{80°\ C.}$), thereby causing the fine particles to float upwardly and recovering a washed phosphor slurry having a particle size between a predetermined maximum and minimum from the bottom of said tank.

10. The process according to claim 9 wherein the velocity of the liquid in the lower section of said first elutriation column is up to two times as great as in the upper section of said column.

11. The process according to claim 9 wherein the particles larger than the predetermined size are withdrawn from the bottom of the first column and ground to a finer particle and then recycled into said elutriation column.

12. The process according to claim 9 wherein said basic slurry is formed by mixing a solution of ethylenediaminetetraacetic acid and ammonia, said solution having a pH of 7.5 to 11, said halophosphate phosphor being admixed in concentrations less than about 250 grams of phosphor per liter of water, said ethylenediaminetetraacetic acid and ammonia solution being admixed with said phosphor slurry in proportions of about ¼ to 5% by weight of ethylenediaminetetraacetic acid to the phosphor in the slurry.

13. The process according to claim 9 wherein particles smaller than a predetermined minimum size are removed from said recovered and washed phosphor and the remainder of said recovered and washed phosphor is dried and then admixed with a solvent, the admixture then being passed through a sieve to deagglomerate outsize particles.

References Cited

UNITED STATES PATENTS

| | | | |
|---|---|---|---|
| 1,449,603 | 3/1923 | Hokanson | 209—160 |
| 2,987,414 | 6/1961 | Martyny | 117—33.5 |
| 3,237,767 | 3/1966 | Fowle | 209—160 |

OTHER REFERENCES

"Sequestrene," Geigy Industrial Chemicals, pp. 2 and 3, 1952.

Chemical Engineer's Handbook; Perry, 3rd ed., p. 937, 1950.

FRANK W. LUTTER, *Primary Examiner.*